P. F. BRITTAIN.
Wheel-Cultivator.

No. 67,949.  Patented Aug. 20, 1867.

Witnesses:
Theo Tusche
J. A. Service

Inventor.
P. F. Brittain
Per Munn & Co.
Attorneys

United States Patent Office.

P. F. BRITTAIN, OF GENESEO, ILLINOIS.

Letters Patent No. 67,949, dated August 20, 1867.

CORN-CULTIVATOR.

The Schedule referred to in these Letters Patent and making part of the same.

TO ALL WHOM IT MAY CONCERN:

Be it known that I, P. F. BRITTAIN, of Geneseo, Henry county, Illinois, have invented a new and improved Corn-Cultivator; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

The object of this invention is to construct a corn-plough, which is so arranged that the ploughs can be set more or less apart and be raised and lowered at will, and be easily handled throughout, and cheaply made. A device for marking the rows is attached to the frame of this plough, and the latter can be adapted for throwing the ground upon or cultivating the corn, and for throwing the ground from the corn, as may be desired.

Figure 1:
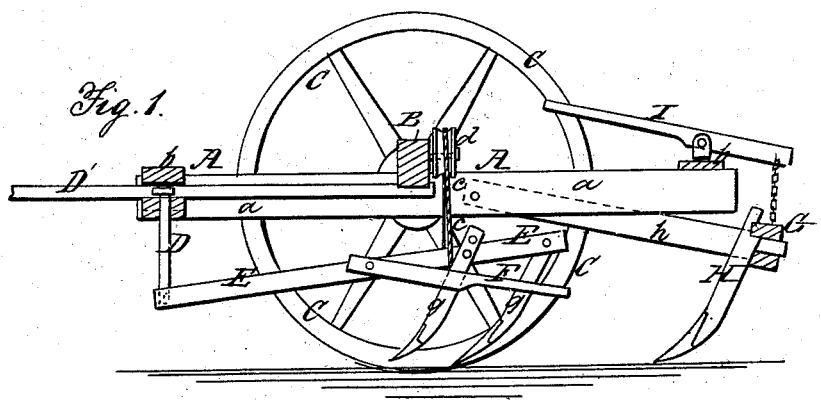
Figure 1 is a longitudinal vertical section of my improved corn-plough, taken in the line $x$ $x$, fig. 2.
Figure 2:
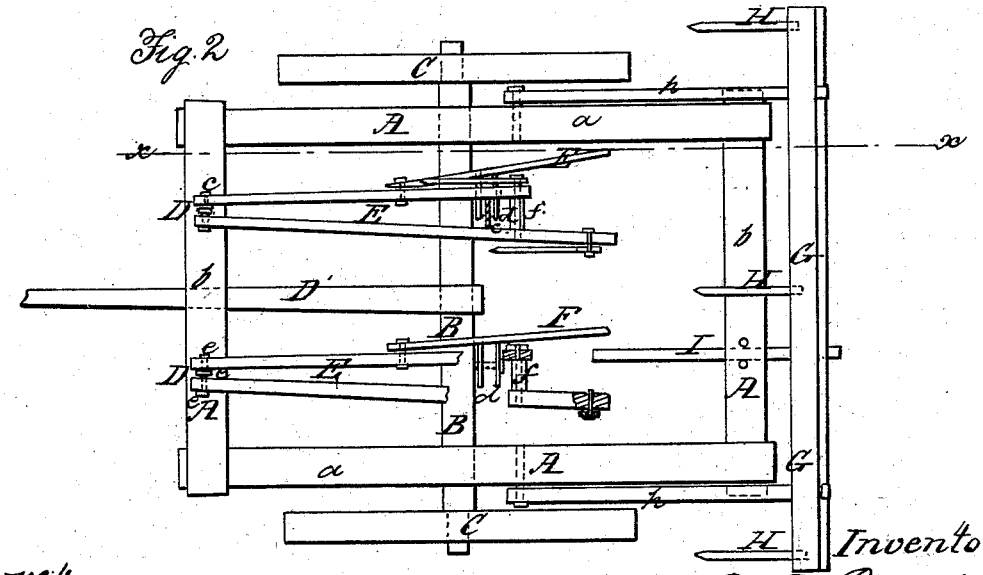
Figure 2 is a bottom view, partly in section, of the same.

A represents a rectangular frame, which consists of two side pieces, $a$, and two or more cross-pieces, $b$ $b$, as shown. Across the frame is laid a stationary axle, B, on the ends of which the wheels C C are mounted upon which the whole machine rests. D is the tongue or pole made and arranged in the ordinary manner. To the front cross-piece are swivelled, so as to be suspended therefrom, two upright bars D D, to the lower ends of each of which the front end of a plough-beam, E, is hinged in such a manner that the rear end of such plough-beam can be raised and lowered at will, while the whole beam can revolve in a horizontal direction around the bar D as its centre. To the rear end of each plough-beam is pivoted a handle, F, to which a cord, $c$, is attached by which the other end is secured to the beam E, and which cord passes over a pulley, O, which is firmly secured to the axle B. Thus by means of this handle the plough-beams can be raised and lowered, and also turned in any direction, as may be desired. As is clearly shown in fig. 2, each plough-beam consists of two braces or bars which are connected in front by the bolt $e$, by which the plough-beam is pivoted to the upright D, and which diverge towards the rear, and are held apart by a washer, $f$, as is clearly shown. To each bar of each plough-beam is secured a standard, $g$, and it is evident that by increasing or diminishing the length of the washer $f$, the ploughs on each beam can be spread more or less apart. The ploughs can be so secured to the standards that they will either throw the ground towards a hill or take it from the corn, as may be desired. To the side pieces $a$ $a$ are pivoted two braces, $h$ $h$, the rear ends of which are connected by a cross-beam, G. To the same are secured three (more or less) standards H to which ploughs can be attached. This device is to be used for marking the rows for planting corn. The beam G can be raised or lowered by a lever, I, which is pivoted to the rear cross-piece $b$, as shown in fig. 1, and the operation of which is easily understood from the drawing.

Having thus described my invention, what I claim as new, and desire to secure by Letters Patent, is—

The marking device consisting of the bars $h$ $h$, beam G, and standards H, in combination with the frame A of a corn-plough, substantially as set forth.

The above specification of my invention signed by me this 6th day of March, 1866.

P. F. BRITTAIN.

Witnesses:
W. B. LAMBERT,
SAMUEL BRADY.